(12) United States Patent
Capecchi et al.

(10) Patent No.: US 12,451,803 B2
(45) Date of Patent: Oct. 21, 2025

(54) VOLTAGE REGULATOR COMPRISING A CHARGE PUMP CIRCUIT

(71) Applicant: STMicroelectronics S.r.l., Agrate Brianza (IT)

(72) Inventors: Laura Capecchi, Vedano al Lambro (IT); Marcella Carissimi, Treviolo (IT); Marco Pasotti, Travaco' Siccomario (IT); Paolo Romele, Cambridge (GB)

(73) Assignee: STMicroelectronics S.r.l., Agrate Brianza (IT)

( * ) Notice: Subject to any disclaimer, the term of this patent is extended or adjusted under 35 U.S.C. 154(b) by 429 days.

(21) Appl. No.: 18/162,870

(22) Filed: Feb. 1, 2023

(65) Prior Publication Data

US 2023/0261574 A1 Aug. 17, 2023

(30) Foreign Application Priority Data

Feb. 15, 2022 (IT) .................. 102022000002786

(51) Int. Cl.
| | |
|---|---|
| *H02M 3/158* | (2006.01) |
| *H02M 1/00* | (2006.01) |
| *H02M 1/08* | (2006.01) |
| *H02M 3/07* | (2006.01) |

(52) U.S. Cl.
CPC ......... *H02M 3/158* (2013.01); *H02M 1/0025* (2021.05); *H02M 1/082* (2013.01); *H02M 3/07* (2013.01)

(58) Field of Classification Search
CPC .... H02M 3/158; H02M 1/0025; H02M 1/082; H02M 3/07
See application file for complete search history.

(56) References Cited

U.S. PATENT DOCUMENTS

| | | |
|---|---|---|
| 7,362,084 B2 | 4/2008 | Tran et al. |
| 8,901,904 B2 | 12/2014 | Caldwell |
| 9,385,600 B2 | 7/2016 | Torres et al. |
| 9,490,824 B1* | 11/2016 | Singh ............. H03L 7/089 |
| 9,705,554 B2 | 7/2017 | Li et al. |
| 2012/0200327 A1* | 8/2012 | Sreekiran ......... H03L 7/0896 327/552 |
| 2012/0235596 A1 | 9/2012 | Yao et al. |

(Continued)

FOREIGN PATENT DOCUMENTS

CN 104660041 A 5/2015

*Primary Examiner* — Rafael O De Leon Domenech
(74) *Attorney, Agent, or Firm* — Slater Matsil, LLP

(57) ABSTRACT

In embodiments, a voltage regulator has an input node to receive an input voltage and an output node. The voltage regulator has a charge pump circuit that receives a boosting control signal to boost the input voltage based on the boosting control signal. The voltage regulator further has a feedback regulation circuit configured to receive the output voltage and to provide a first operation control signal and a second operation control signal as a function of the output voltage; a phase control circuit configured to receive the first operation control signal and to provide the boosting control signal as a function of the first operation control signal; and a filter coupled to the output node, configured to receive the second operation control signal and configured to inject to or sink from the output node a charge that is a function of the second operation control signal.

20 Claims, 5 Drawing Sheets

(56) References Cited

U.S. PATENT DOCUMENTS

| | | | |
|---|---|---|---|
| 2012/0313701 A1* | 12/2012 | Khlat | H02M 3/07 |
| | | | 330/127 |
| 2014/0097895 A1* | 4/2014 | Khlat | H03F 3/245 |
| | | | 330/251 |
| 2017/0149329 A1* | 5/2017 | Wang | H03L 7/093 |
| 2020/0119643 A1* | 4/2020 | Petracca | H02M 3/156 |

* cited by examiner

VOLTAGE REGULATOR COMPRISING A CHARGE PUMP CIRCUIT

CROSS-REFERENCE TO RELATED APPLICATIONS

This application claims priority to Italian Application No. 102022000002786, filed on Feb. 15, 2022, which application is hereby incorporated by reference herein in its entirety.

TECHNICAL FIELD

The present disclosure generally relates to voltage regulators, and in particular embodiments, to a voltage regulator with a charge pump circuit.

BACKGROUND

Generally, voltage regulators with a charge pump circuit are used to generate an output voltage higher than the respective input voltage (i.e., operating as a DC-DC boost converter), by exploiting clocked charge transfer between capacitors used as charge-accumulation elements.

In particular, in SoC (System on a Chip) applications, there is often the need to generate high internal voltages to drive specific circuit blocks.

For example, charge pump circuits are used in non-volatile memories, such as the flash, EEPROM, or PCM type, wherein programming and erasing operations are performed by applying voltages to the memory cells that are higher than the internal supply voltage available within the memory.

FIG. 1 shows a block diagram of a known voltage regulator 1, including a charge pump circuit 5 coupled between an input node 6, at an input voltage $V_{IN}$, and an output node 7, at an output voltage $V_{OUT}$. A capacitive load 9 having a capacitance $C_L$ is coupled between the output node 7 and ground. The charge pump circuit 5 includes one or more charge-pump stages, for example, voltage doublers, here not shown, that are cascaded (or series-connected) between the input node 6 and the output node 7.

The voltage regulator 1 provides an on-off regulation of the charge-pump circuit 5 (i.e., it has a control loop circuit configured to control the activation of the charge pump circuit 5) such that the output voltage $V_{OUT}$ is kept at a reference desired voltage $V_{REF}$.

The voltage regulator 1 includes a comparator 11 that receives the output voltage $V_{OUT}$ and the reference voltage $V_{REF}$ and provides a stop signal STOP; an oscillator 13 that is coupled to the output of the comparator 11 and provides a clock signal CLK; and a logic circuit 15 that receives the clock signal CLK and the input voltage $V_{IN}$ and provides phase or boosting signals PHASES to the charge pump circuit 5.

The phase signals PHASES are square-wave signals that have the frequency of the clock signal CLK and control the functioning of the stages of the charge pump circuit 5.

As shown in the timing diagram of FIG. 2, in use, the voltage regulator 1 has an on-phase, wherein the output voltage $V_{OUT}$ is smaller than the reference voltage $V_{REF}$, and an off-phase, wherein the output voltage $V_{OUT}$ is higher than the reference voltage $V_{REF}$.

In the on-phase, comparator 11 keeps the stop signal STOP at a low value and the logic circuit 15 switches the phase signals PHASES between a low and a high value to activate the charge pump circuit 5 and increase the value of the output voltage $V_{OUT}$.

In the off-phase, comparator 11 keeps the stop signal STOP at a high value and logic circuit 15 freezes the commutation of the phase signals PHASES, thereby stopping the functioning of the charge pump circuit 5.

However, voltage regulator 1, comparator 11, oscillator 13, and logic circuit 15 each have a response time that introduces a delay in the effective time instant at which the pump charge circuit 5 is switched between the on and off phases.

As shown in FIG. 2, the time instant $t_2$ at which comparator 11 switches the stop signal STOP to the high value is delayed concerning the time instant $t_1$ at which the output voltage $V_{OUT}$ effectively overcomes the reference voltage $V_{REF}$, due to the delay of the comparator 11.

Moreover, the time instant $t_3$, at which the logic circuit 15 freezes the switching of the phase signals PHASES, is delayed concerning the time instant $t_2$ due to the delay of the logic circuit 15.

In practice, between the time instant $t_1$, at which the charge pump circuit 5 should stop operating, and the time instant $t_2$, at which the charge pump circuit 5 stops operating, the output voltage $V_{OUT}$ keeps increasing above the reference voltage $V_{REF}$.

During the off-phase, the output voltage $V_{OUT}$ decreases because of a discharge current flowing through load 9 and other circuitry (here not shown) connected at the output node 7 of the voltage regulator 1.

After the output voltage $V_{OUT}$ decreases below the reference voltage (time instant $t_4$), comparator 11 switches the stop signal STOP to the low value (time instant $t_5$) and logic circuit 15 starts the commutation of the phase signals (time instant $t_0$).

However, similarly to what was discussed above, between the time instant $t_4$, at which the charge pump circuit 5 should start functioning, and the time instant to, at which the charge pump circuit 5 starts functioning, the output voltage continues to decrease below the reference voltage $V_{REF}$.

In practice, in use, in the voltage regulator 1, the output voltage $V_{OUT}$ oscillates around the reference voltage $V_{REF}$ forming ripples having a high peak-to-peak amplitude $V_R$, for example, up to hundreds of mV (e.g., 160 mV).

The ripples of the output voltage $V_{OUT}$ degrade the performance of the voltage regulator 1. For example, if voltage regulator 1 is used in a non-volatile memory, the high ripples of the output voltage your cause variations in the programming currents of the memory cells, thereby causing errors or malfunctions of the non-volatile memory.

One approach to reducing the amplitude $V_R$ of the ripples is to couple a large filtering capacitor in parallel to load 9 (i.e., between the output node 7 and ground). The filtering capacitors have a capacitance value equal to or higher than the capacitance $C_L$ of load 9. However, this approach requires a high occupation of the die area wherein voltage regulator 1, or the electronic device incorporating voltage regulator 1, is formed.

Another approach to reducing the amplitude $V_R$ of the ripples is to design a faster regulation loop (i.e., designing comparator 11, oscillator 13, and logic circuit 15) to react faster in response to changes in the output voltage $V_{OUT}$ above and below the reference voltage $V_{REF}$. However, this approach increases the fabrication cost and the design complexity of voltage regulator 1. Moreover, even with this approach, comparator 11, oscillator 13, and logic circuit 15 would maintain a response delay that cannot be avoided.

SUMMARY

The aim of the present invention is to overcome the disadvantages of the prior art.

According to the present invention, a voltage regulator and a method for operating a voltage regulator are provided, as defined in the attached claims.

The present voltage regulator has an input node receiving an input voltage and an output node. The voltage regulator includes a charge pump circuit configured to provide, at the output node, an output voltage having a boosted value with respect to the input voltage, wherein the boosting of the input voltage is performed based on a boosting control signal. The voltage regulator further includes a feedback regulation circuit configured to provide a first operation control signal and a second operation control signal as a function of the output voltage; a phase control circuit configured to receive the first operation control signal and to provide the boosting control signal as a function of the first operation control signal; and a filter coupled to the output node, configured to receive the second operation control signal and configured to inject to or sink from the output node a charge that is a function of the second operation control signal.

According to an embodiment, the feedback regulation circuit has an inverter configured to receive the first operation control signal and to provide the second operation control signal.

According to an embodiment, the inverter has a response time in providing the second operation control signal in response to a switch of the first operation control signal and the phase control circuit has a response time in providing the phase control signal in response to the switch of the first operation control signal. The response time of the inverter is shorter than the response time of the phase control circuit.

BRIEF DESCRIPTION OF THE DRAWINGS

For a better understanding of the present invention, non-limiting embodiments are now described, with reference to the attached drawings, wherein.

DETAILED DESCRIPTION OF ILLUSTRATIVE EMBODIMENTS

Figure 3:
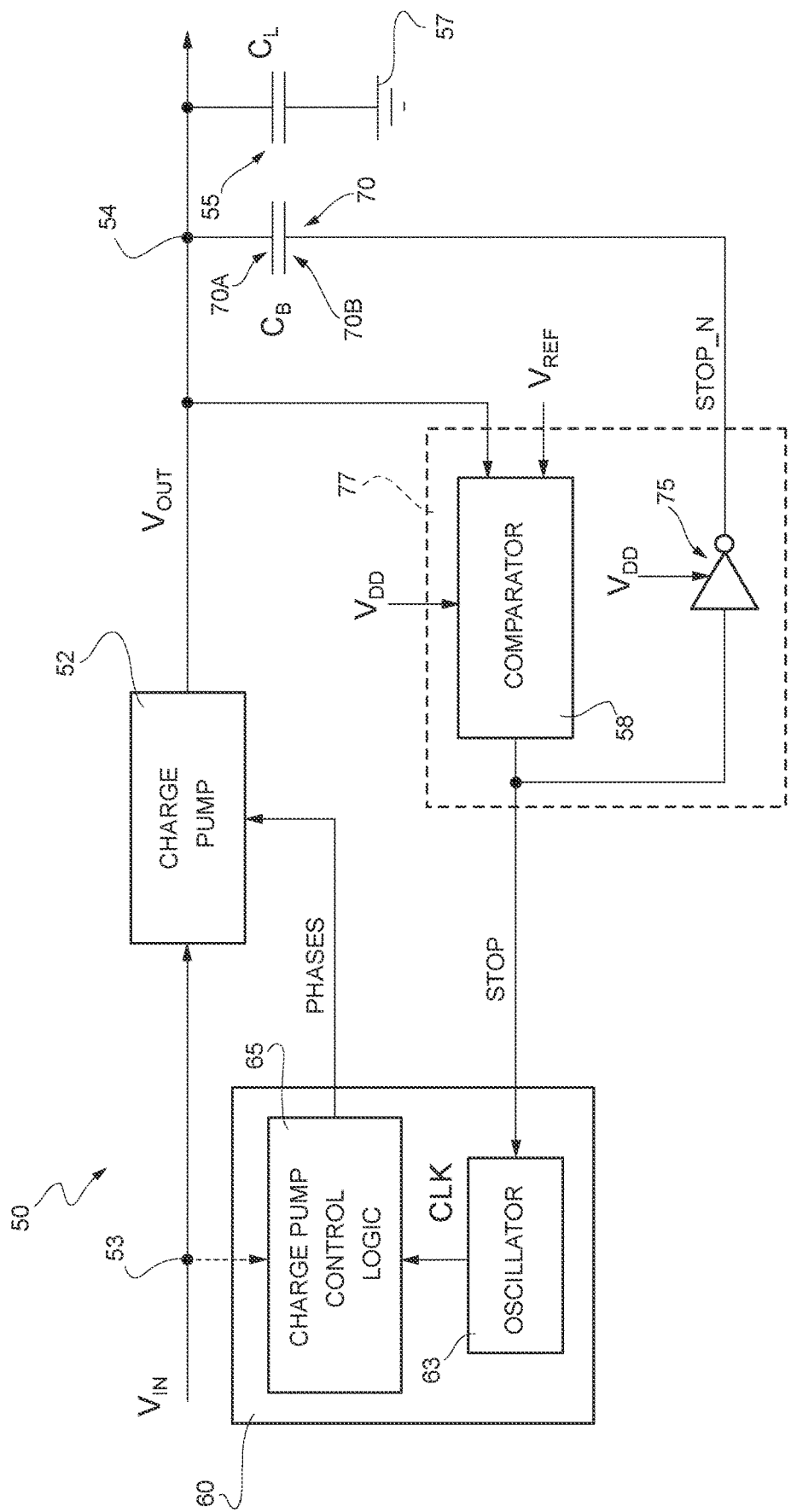
FIG. 3 shows a block diagram of an embodiment of the present voltage regulator including a charge pump circuit.

FIG. 3 shows a voltage regulation circuit or voltage regulator 50, including a charge pump circuit 52 connected between an input node 53, receiving an input voltage $V_{IN}$, and an output node 54, providing an output voltage $V_{OUT}$.

Voltage regulator 50 provides output voltage $V_{OUT}$ to a load, here a capacitive load 55 having a capacitance $C_L$, coupled between output node 54 and a reference potential line (ground) 57.

The input voltage $V_{IN}$ is a low voltage, for example, included between 1V and 4 V, in particular of about 2.8 V, which may be an internal supply voltage (i.e., the logic supply voltage $V_{DD}$ of voltage regulator 50 or a different voltage generated by other circuit components, here not shown) coupled to the voltage regulator 50.

Charge pump circuit 52 may include one boosting stage connected between input node 53 and output node 54 or a plurality of boosting stages mutually connected in series or in parallel between the input node 53 and the output node 54.

The boosting stages are of a known type, for example, the boosting stages may each be a voltage doubler circuit or a different type of circuit, depending on the specific application.

Circuit pump circuit 52 receives one or more phase signals PHASES (also indicated hereinafter as boosting control signals) that control the selective activation and deactivation of the boosting stages to enable the selective and alternate transfer of charge accumulated in each boosting stage from one boosting stage to the next.

Figure 4:
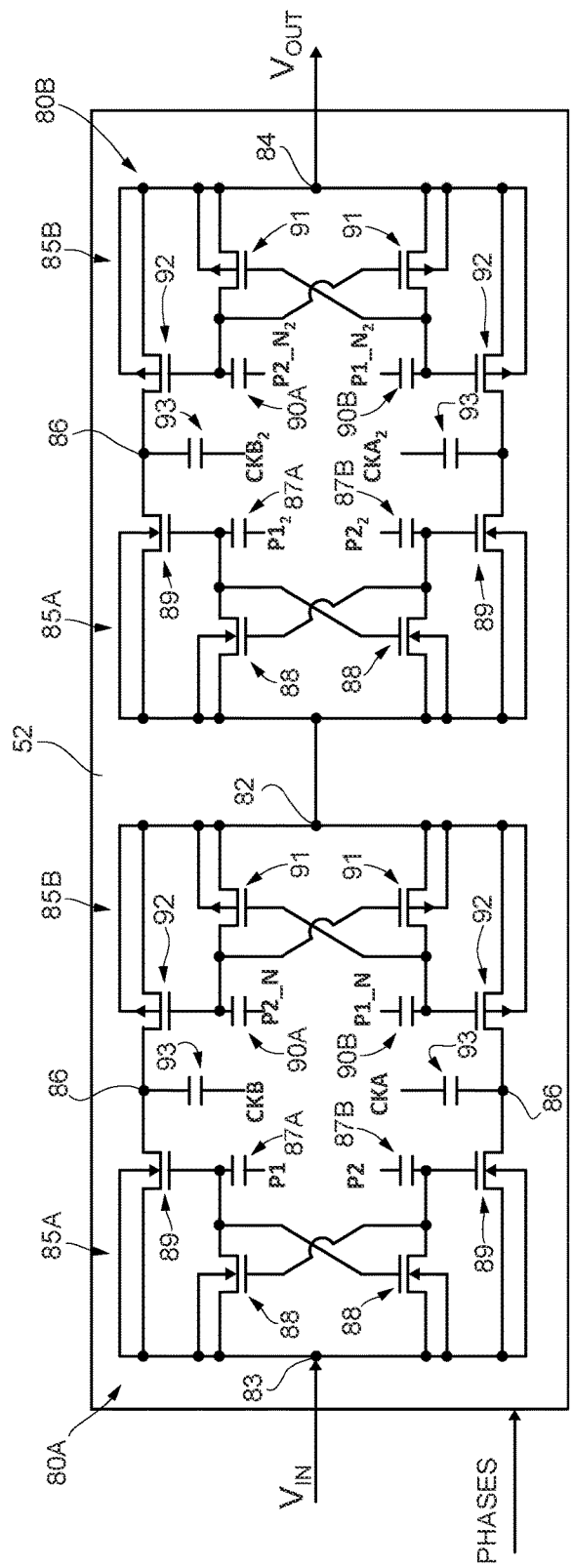
FIG. 4 shows a circuit diagram of an exemplary embodiment of the charge pump circuit of FIG. 3.

An exemplary embodiment of charge pump circuit 52 is shown in FIG. 4 and described in detail hereinafter.

Voltage regulator 50 provides an on-off regulation of charge pump circuit 52 to keep the output voltage $V_{OUT}$ equal to the desired output voltage, for example, included between 4 V and 6 V, here indicated as reference voltage $V_{REF}$.

In embodiments, voltage regulator 50 includes a comparator 58, which receives output voltage $V_{OUT}$ and reference voltage $V_{REF}$ and provides an operation control signal, here indicated as stop signal STOP, and a phase control circuit 60 receiving the stop signal STOP and providing the phase signals PHASES. Comparator 58 provides the stop signal STOP in response to comparing output voltage $V_{OUT}$ and reference voltage $V_{REF}$. In this embodiment, stop signal STOP is a square wave signal having a high logic value, here logic supply voltage $V_{DD}$, and a low logic value, here 0 V. Comparator 58 switches the stop signal STOP to the high logic value when the output voltage $V_{OUT}$ becomes higher than the reference voltage $V_{REF}$ and switches the stop signal STOP to the low logic value when the output voltage $V_{OUT}$ becomes lower than the reference voltage $V_{REF}$. In this embodiment, comparator 58 is biased by the logic supply voltage $V_{DD}$.

Phase control circuit 60 includes an oscillator 63, which receives the stop signal STOP and provides a clock signal CLK, and a logic control circuit 65, which receives the clock signal CLK and provides the phase signal PHASES to the charge pump circuit 52.

While the stop signal STOP has a low logic value, the clock signal CLK switches between a low logic value (e.g., 0 V) and a high logic value (e.g., the logic supply voltage $V_{DD}$) with a high frequency, for example, of the order of megahertz (e.g. of 150 MHz).

While the stop signal STOP has a high logic value, oscillator 63 stops switching the clock signal CLK between the respective high and low logic values. For example, when the stop signal STOP switches from the respective low logic value to the respective high logic value (i.e., on the rising edge of the stop signal STOP), oscillator 63 freezes the clock signal CLK to the current (or actual) value thereof.

Figure 5:
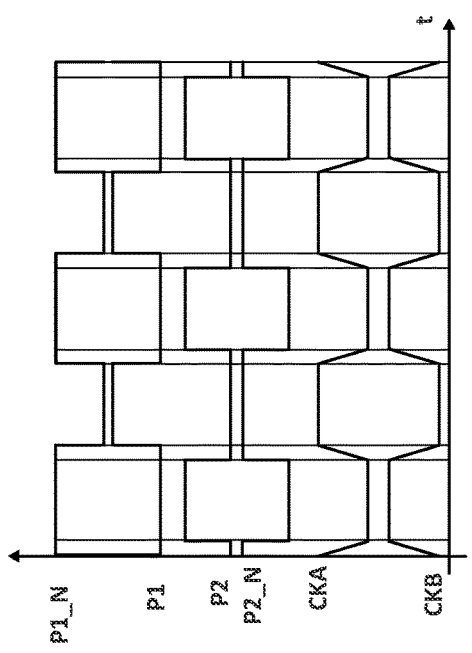
FIG. 5 shows a time diagram of waveforms of the charge pump circuit of FIG. 4, in use.

Logic control circuit 65 provides the phase signals PHASES to the charge pump circuit 52. The number of the phase signals PHASES depends on the specific implementation of charge pump circuit 52, for example, on the number and specific configuration and type of the stages of charge pump circuit 52. By way only and described hereinafter, FIG. 5 shows examples of phase signals PHASES of the exemplary embodiment of charge pump circuit of FIG. 4.

According to an embodiment, logic control circuit 65 may include one or more level shifter circuits configured to adjust the high and low logic voltage values of the phase signals PHASES starting from the clock signal CLK. For example, level shifter circuits may be used if the input voltage $V_{IN}$ differs from the logic supply voltage $V_{DD}$. In this case, as indicated by a dashed arrow in FIG. 3, logic control circuit 65 receives the input voltage $V_{IN}$.

Voltage regulator 50 further includes a regulation capacitor 70 having a capacitance $C_B$ and having a first terminal 70A coupled to the output node 54 and a second terminal 70B receiving an inverted stop signal STOP_N.

The capacitance $C_B$ of regulation capacitor 70 is smaller than the load capacitance, for example, included between 1/30 and 1/10, in particular 1/20, of the capacitance $C_L$ of load 55. In embodiments, the ratio between the capacitance $C_B$ of the regulation capacitor 70 and the capacitance $C_L$ of the load 55 may be chosen depending on the ratio between $\Delta V$ and the logic supply voltage $V_{DD}$, wherein $\Delta V$ is the desired voltage reduction of the ripple of the output voltage $V_{OUT}$, in use, as discussed in detail hereinafter.

In embodiments, voltage regulator 50 further includes an inverter 75 receiving the stop signal STOP and providing the inverted stop signal STOP_N. In this embodiment, inverter 75 is biased at the logic supply voltage $V_{DD}$; however, inverter 75 may be biased at a different voltage (e.g., the input voltage $V_{IN}$).

Inverter 75 has a low response time, for example, of a few nanoseconds (e.g., included between 1 ns and 6 ns) with respect to a switch of the stop signal STOP.

In embodiments, in response to a switch of stop signal STOP from the respective low logic value to the respective high logic value, inverter 75 switches the inverted stop signal STOP_N from the respective high logic value to the respective low logic value in a short time interval, for example, of few nanoseconds, in particular included between 1 ns and 6 ns.

Similarly, in response to a switch of stop signal STOP from the respective high logic value to the respective low logic value, inverter 75 switches the inverted stop signal STOP_N from the respective low logic value to the respective high logic value in a short time interval, for example, of few nanoseconds, in particular included between 1 ns and 6 ns.

In practice, the response time of inverter 75 is lower than the time taken by phase control circuit 60 to react to a switch of the stop signal STOP (i.e., to start or stop the operation of the charge pump circuit 52).

In practice, inverter 75 and comparator 58 form a feedback regulation circuit 77, represented in FIG. 3 by a dashed line, configured to provide the stop signal STOP and the inverted stop signal STOP_N as a function of the output voltage $V_{OUT}$, in particular as a function of the comparison between the output voltage $V_{OUT}$ and the reference voltage $V_{REF}$.

By example only, FIG. 4 shows a detailed embodiment of charge pump circuit 52 having two boosting stages 80A, 80B, mutually coupled at an intermediate node 82 of charge pump circuit 52. Boosting stage 80A has an input node 83 that receives input voltage $V_{IN}$ and an output node directly connected to intermediate node 82. Boosting stage 80B has an input node directly connected to intermediate node 82 and an output node 84 providing output voltage $V_{OUT}$.

Boosting stages 80A, 80B, here equal with each other, are each a voltage double circuit and are each formed by a respective first portion 85A, coupled between the respective input node 83, 82 and a respective stage intermediate node 86, and by a respective second portion 85B, coupled between the respective stage intermediate node 86 and the respective output node 82, 84.

First portion 85A of boosting stages 80A, 80B is formed by two pumping capacitors 87A, 87B having a first terminal coupled to input node 83, 82 of the respective boosting stage 80A, 80B through respective switches, here two MOSFET transistors 88. The first terminal of the pumping capacitors 87A, 87B is also coupled to the gate terminal of a respective MOSFET transistor 89 whose conduction terminals (source and drain) are connected to the input node 83, 82 of the respective boosting stage 80A, 80B and the stage intermediate node 86.

Second portion 85B of boosting stages 80A, 80B is formed by two pumping capacitors 90A, 90B having a first terminal coupled to the output node 82, 84 of the respective boosting stage 80A, 80B through respective switches, here two MOSFET transistors 91. The first terminal of the pumping capacitors 90A, 90B is also coupled to the gate terminal of a respective MOSFET transistor 92 whose conduction terminals (source and drain) are connected to the output node 82, 84 of the respective boosting stage 80A, 80B and the stage intermediate node 86.

Boosting stages 80A, 80B further have each two pass capacitors 93 having a first terminal coupled to the intermediate node 86 of the respective boosting stage 80A, 80B.

According to the example of FIG. 4, logic control circuit 65 provides a plurality of phase signals PHASES, including phase signals P1, P2, P1_N, P2_N, CKA, and CKB (of which an example is shown in FIG. 5) that are provided to boosting stage 80A and phase signals $P1_2$, $P2_2$, $P1\_N_2$, $P2\_N_2$, $CKA_2$, and $CKB_2$ that are provided to the boosting stage 80B.

In embodiments, phase signals P1 and P2 are provided to a second terminal of the pumping capacitor 87A and, respectively, to a second terminal of the pumping capacitor 87B. Phase signals P1_N and P2_N are complimentary (negated) with respect to phase signals P1 and, respectively, P2 and are provided to a second terminal of the pumping capacitor 90A and, respectively, to a second terminal of the pumping capacitor 90B. Phase signals CKA and CKB are negated one with respect to the other and are provided to the pass capacitors 87A, 87B, respectively. In this embodiment, phase signals $P1_2$, $P2_2$, $P1\_N_2$, $P2\_N_2$, $CKA_2$, and $CKB_2$ are equal to phase signals P1, P2, P1_N, P2_N, CKA, and CKB, respectively, and have a 90° phase shift thereto.

In use, voltage regulator 50 has an on-phase, where charge pump circuit 52 is active and enables accumulation and transfer of charges between input node 52 and output node 54, and an off-phase, where charge pump circuit 52 is deactivated and accumulation and transfer of charges between input node 52 and output node 54 are stopped. During the on-phase, output voltage your increases in time.

For example, with reference to the exemplary implementation of charge pump circuit 52 of FIG. 4, FIG. 5 shows a possible behavior in time of phase signals P1, P2, P1_N, P2_N, CKA, and CKB during the on-phase of the voltage regulator 50. In embodiments, phase signals P1, P2, P1_N, P2_N, CKA, and CKB oscillate, during the on-phase, between a respective high and a respective low logic value to enable sequential accumulation and transfer of charges between input node 52 and output node 54, through boosting stage 80A, 80B of circuit pump circuit 52.

During the off-phase, the phase signals PHASES have a constant value (i.e., do not oscillate), thereby deactivating the accumulation and transfer of charges through charge pump circuit 52. During the off-phase, the output voltage $V_{OUT}$, decreases in time due to a current flowing through load 55 (i.e., from the output node 54 to the ground 57).

In voltage regulator 50, during the on-phase, when output voltage $V_{OUT}$ becomes higher than the reference voltage $V_{REF}$, comparator 58 switches the stop signal STOP to the respective high value (i.e., logic supply voltage $V_{DD}$).

Accordingly, inverter 75 switches inverted stop signal STOP_N to the respective low value. When inverted stop signal STOP_N switches from the high value (i.e., supply logic voltage $V_{DD}$) to the low value (i.e., 0 V), a voltage change equal to the difference between the high value and the low value (i.e., equal to $V_{DD}$) occurs at the second terminal 70B of regulation capacitor 70. Accordingly, regulation capacitor 70 sinks, from the output node 54, a charge equal to $CC_B \cdot V_{DD}$, thereby lowering the value of output voltage $V_{OUT}$.

Therefore, even if phase control circuit 60 has a time delay before stopping the phase signals PHASES and deactivating charge pump circuit 52, the increase of output voltage $V_{OUT}$ that would occur during the time delay is, at least partially, compensated by charge $CC_B \cdot V_{DD}$ sunk by regulation capacitor 70.

During the off-phase of voltage regulator 50, when output voltage $V_{OUT}$ decreases below reference voltage $V_{REF}$, comparator 58 switches the stop signal STOP to the respective low value (i.e., 0 V). Accordingly, inverter 75 switches the inverted stop signal STOP_N to the respective high value (i.e., logic supply voltage $V_{DD}$).

When inverted stop signal STOP_N switches from the low value (i.e., 0 V) to the low value (i.e., supply logic voltage $V_{DD}$), a voltage change equal to the difference between the low value and the high value (i.e., equal to $V_{DD}$) occurs at the second terminal 70B of regulation capacitor 70. Accordingly, regulation capacitor 70 injects to output node 54 a charge equal to $CC_B \cdot V_{DD}$, thereby increasing the value of output voltage V.

Therefore, even if phase control circuit 60 has a time delay before activating charge pump circuit 52, the decrease of output voltage your that would occur during the time delay is, at least partially, compensated by the charge $CC_B \cdot V_{DD}$ injected by regulation capacitor 70 to output node 54.

In practice, regulation capacitor 70 acts as a filter that injects to or sinks from output node 54 an amount of charge that is a function of the inverted stop signal STOP_N.

For example, considering $V_{DD}=1$ V and capacitance $C_B$ of regulation capacitor 70 to be 1/20 of load capacitor 55, a high-low (or low-high) switch of the stop signal STOP may change output voltage your by tens of millivolts.

Figure 1:
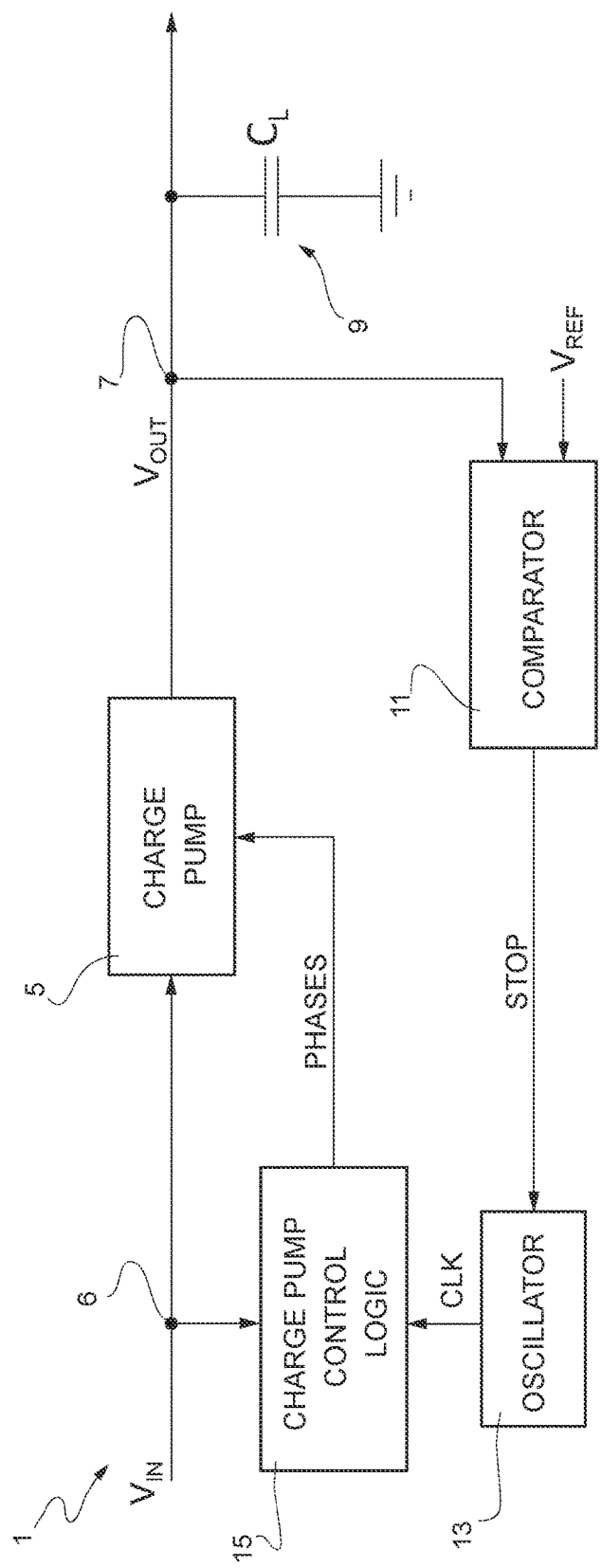
FIG. 1 shows a block diagram of a known voltage regulator including a charge pump circuit.
Figure 2:
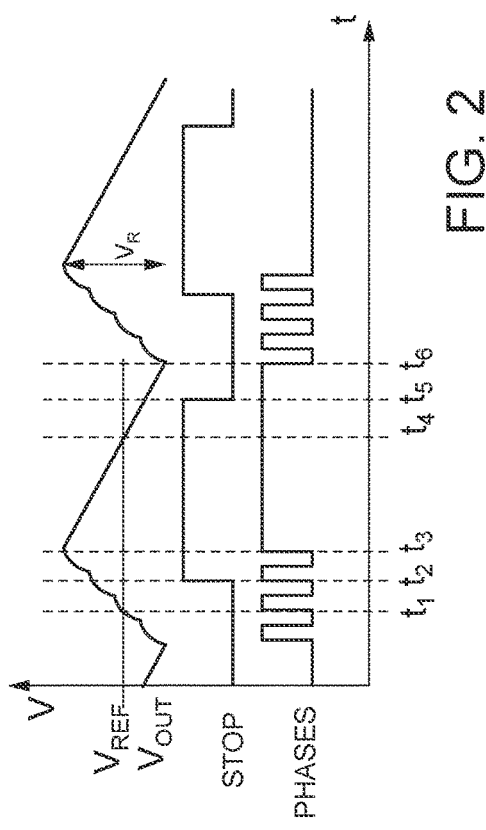
FIG. 2 shows a time diagram of waveforms of the voltage regulator of FIG. 1, in use.

It has been verified by Applicant that the peak-to-peak amplitude of the ripples of output voltage your of voltage regulator 50 may be reduced, for example, of about 40%, with respect to peak-to-peak amplitude $V_R$ of the ripples of output voltage your of the known voltage regulator 1 described with reference to FIGS. 1 and 2.

By tuning the absolute value of the high-low voltage difference of the inverted stop signal STOP_N and the value of the capacitance $C_B$ of regulation capacitor 70, for example, at the design stage or in use, it is possible to adjust the charges injected to and sunk from output node 54, thereby adjusting the correction amount of the peak-to-peak amplitude of the ripples of output voltage $V_{OUT}$.

It is possible to reduce the ripples of output voltage $V_{OUT}$ by keeping the capacitance $C_B$ of regulation capacitor 70 much smaller than the capacitance $C_L$ of capacitive load 55, which allows voltage regulator 50 to occupy a smaller die area resulting in lower manufacturing costs.

Figure 6:
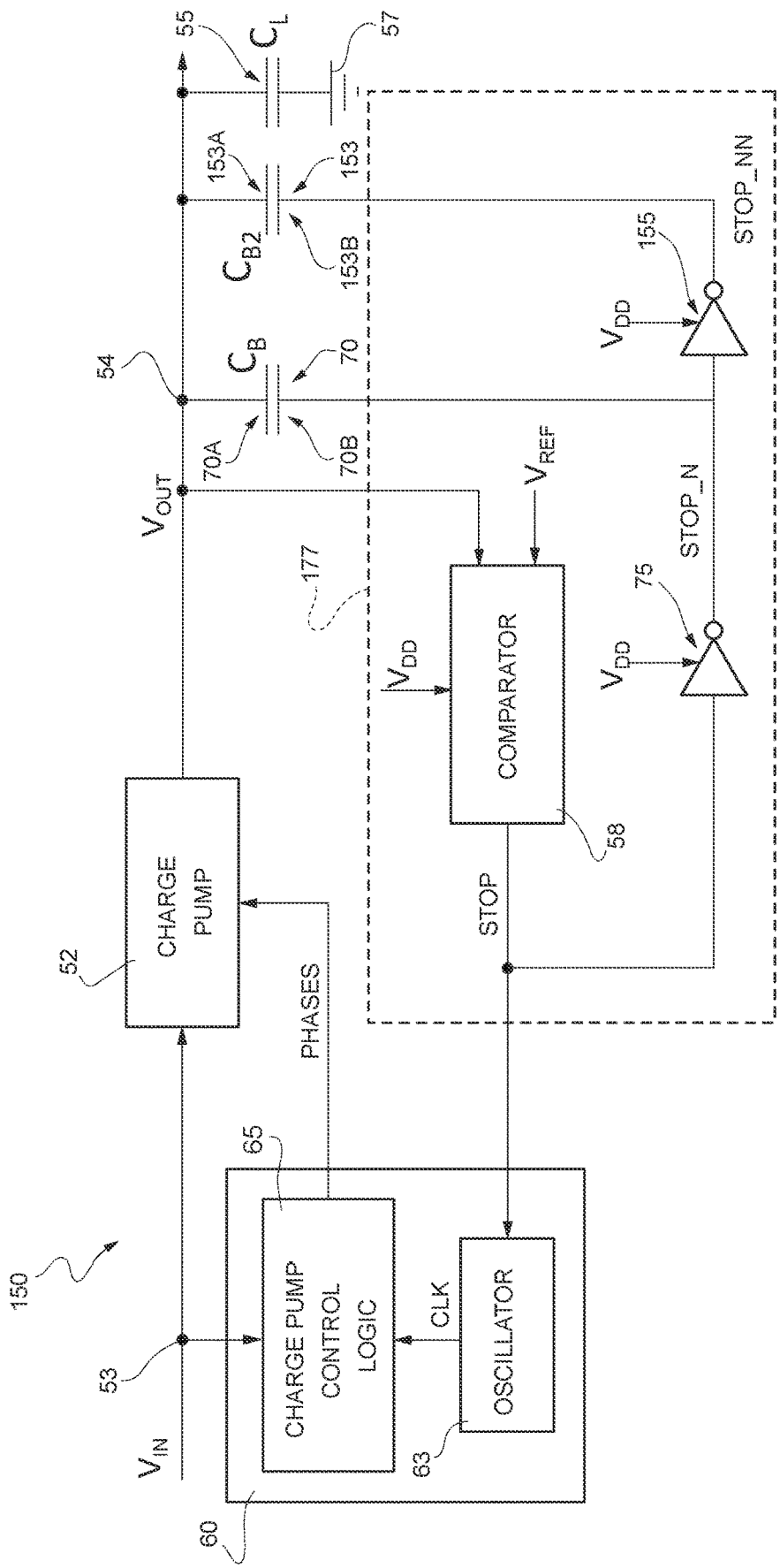
FIG. 6 shows a block diagram of a different embodiment of the present voltage regulator.

FIG. 6 shows a different embodiment of the present voltage regulator, indicated by 150. Voltage regulator 150 has a general structure similar to voltage regulator 50 of FIG. 2; therefore, elements in common are indicated by the same reference numerals and are not further described.

In embodiments, voltage regulator 150 includes charge pump circuit 52 coupled between input node 53 and output node 54; comparator 58 receiving the output voltage $V_{OUT}$ and providing the stop signal STOP; and phase control circuit 60 receiving the stop signal STOP and providing the phase signals PHASES. Voltage regulator 150 also includes the regulation capacitor 70, indicated as the first regulation capacitor 70, and the inverter 75, indicated as the first inverter 75. Voltage regulator 150 further includes a second regulation capacitor 153 and a second inverter 155. Second regulation capacitor 153 has a capacitance $C_{B2}$ smaller than the capacitance $C_L$ of capacitive load 55, for example, included between 1/30 and 1/10 of the capacitance $C_L$, in particular about 1/20 of the capacitance $C_L$.

The second regulator capacitor 153 has a first terminal 153A coupled to the output node 54 and a second terminal 153B coupled to the output of the second inverter 155. Second inverter 155 receives the inverted stop signal STOP_N, here indicated as the first inverted stop signal STOP_N, from first inverter 75 and provides at the output a second inverted stop signal STOP_NN.

In practice, first inverter 75, comparator 58, and second inverter 175 form a feedback regulation circuit, here indicated by 177 and represented by a dashed line, configured to provide the stop signal STOP, the first inverted stop signal STOP_N and the second inverted stop signal STOP_NN as a function of the output voltage $V_{OUT}$, in particular as a function of the comparison between the output voltage $V_{OUT}$ and the reference voltage $V_{REF}$.

The second inverter 155 is biased by logic supply voltage $V_{DD}$. In this embodiment, the high logic value of the second inverted stop signal STOP_NN is logic supply voltage $V_{DD}$, and the low logic value of the second inverted stop signal STOP_NN is 0 V.

Second inverter 155 has a response time that is higher than the response time of first inverter 75, for example, at least ten times higher, for example of tens of nanoseconds, in particular included between 20 ns and 100 ns.

The response time of the second inverter 155 may be equal to or higher than the time taken by phase control circuit 60 to react to a switch of the stop signal STOP (i.e., to start or stop the operation of the charge pump circuit 52).

In embodiments, in response to a switch of the first inverted stop signal STOP_N from the respective low logic value to the respective high logic value, second inverter 155 switches the second inverted stop signal STOP_NN from the respective high logic value to the respective low logic value in a time interval of, for example, tens of nanoseconds, in particular included between 20 ns and 100 ns.

In response to a switch of the first inverted stop signal STOP_N from the respective high logic value to the respective low logic value, second inverter 155 switches the second inverted stop signal STOP_NN from the respective low logic value to the respective high logic value in a time interval of, for example, tens of nanoseconds, in particular included between 20 ns and 100 ns.

In practice, second inverter 155 has a low driving capability so that second terminal 153B of second regulation capacitor 153 is driven from a low logic value to a high logic value, and from a high logic value to the low logic value, with a slope that may last tens of nanoseconds (i.e., slower than the response time of the first inverter 75).

In use, similarly to what is described with reference to FIG. 3 for the first regulation capacitor 70, a switch in the stop signal STOP, and therefore in the second inverted stop signal STOP_NN, causes a charge equal to $C_{B2} \cdot V_{DD}$ to be slowly sunk from or injected to output node 54 of voltage regulator 150.

In embodiments, when the stop signal STOP switches from the respective high to the respective low logic value, also the second stop inverted signal STOP_NN switches from the respective high to the respective low logic value, thereby sinking a charge $C_{B2} \cdot V_{DD}$ from output node 54, limiting a voltage rising thereof. On the other hand, when the stop signal STOP switches from the respective low to the respective high logic value, also the second stop inverted signal STOP_NN switches from the respective low to the respective high logic value, thereby injecting a charge $C_{B2} \cdot V_{DD}$ to output node 54; thus, helping to sustain the consumption from an external load (e.g., load 55). In practice, the second inverter 155 has a response time higher than the first inverter 75 allowing a further reduction to the ripples of output voltage $V_{OUT}$, in particular, if voltage regulator 150 is coupled at the output to a low-current load.

The present voltage regulator may be incorporated into an electronic device to provide a stable voltage source within the electronic device.

Figure 7:
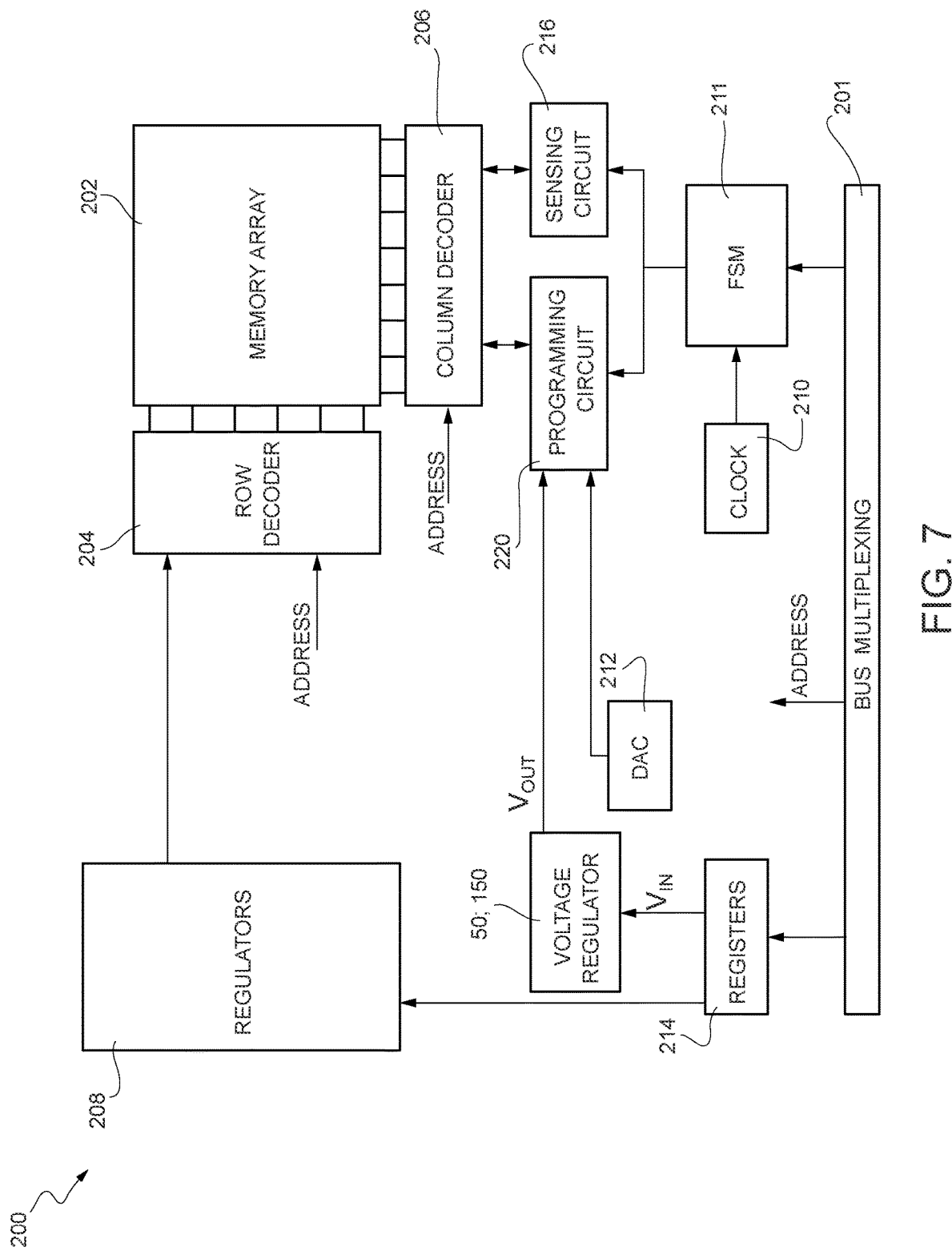
FIG. 7 shows a block diagram of a non-volatile memory incorporating the present voltage regulator.

For example, FIG. 7 shows a block diagram of a memory 200, including, by way of example, voltage regulator 50 of FIG. 3. However, memory 200 may include voltage regulator 150 of FIG. 6.

Memory 200 is a non-volatile memory of known type, in particular here a phase-change type of memory (PCM), which can be integrated within an electronic apparatus (e.g., a smartphone, laptop, camera, wearable device, etc., here not shown) and coupled thereto through a multiplexing bus 201.

Memory 200 includes a PCM memory array 202 having a plurality of memory cells arranged in a plurality of rows and columns; a row decoder 204 and a column decoder 206 configured to select, in use, a memory cell of the PCM memory array 202, from an address signal ADDRESS, on which to perform an operation (e.g., read or write); voltage regulators 208 coupled to the row decoder 204; an internal clock 210; a finite state machine (FSM) 211; a digital-to-analog converter, DAC, 212; several internal registers 214; and a sensing circuit 216 configured to read a state of an addressed memory cell.

FSM 211 controls the internal operations of the memory 200 (e.g., boot, write, read, etc.) and manages data reception and transmission through the multiplexing bus 201.

Memory 200 further includes a programming circuit 220, coupled to column decoder 206, FSM 211, and DAC 212. Programming circuit 220 is also coupled to output node 54 of voltage regulator 50 and receives therefrom output voltage $V_{OUT}$.

Programming circuit 220 is configured to change the state (i.e., write operation) of an addressed memory cell of the PCM memory array 202. In embodiments, to change the state of a memory cell, programming circuit 220 uses a high voltage (i.e., the output voltage $V_{OUT}$ of the voltage regulator 50) to generate a high programming current.

Voltage regulators 50, 150 generate a more stable output voltage with respect to known voltage regulators (for example, the known voltage regulator 1 of FIG. 1), allowing programming circuit 220 to generate a stable programming current. Therefore, writing errors in memory 200 may be avoided. Therefore, memory 200 has high reliability.

It is clear that voltage regulators 50, 150 may be subject to modifications and variations without departing the scope of the present invention, as defined in the attached claims. For example, regulation capacitors 70, 153 may be formed by any electronic device behaving as a capacitive element, for example, a transistor (e.g., an NMOS transistor having the gate connected to output node 54 and having a source, a drain and a bulk mutually connected to each other and the output of inverters 75, 155. Moreover, capacitors 70, 153 may form a filter including other electric elements, here not shown, either passive or active, such as resistors, depending on the specific application.

Figure 8:
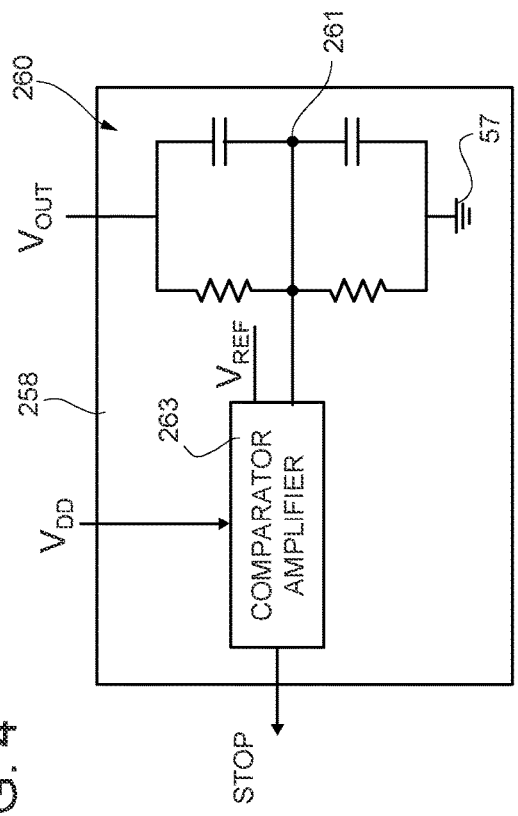
FIG. 8 shows a circuit diagram of an embodiment of a comparator of the present voltage regulator.

For example, FIG. 8 shows a different embodiment of the comparator, here indicated by 258, of voltage regulators 50, 150. Comparator 258 includes a voltage divider 260 coupled between output voltage $V_{OUT}$ and ground 57 and having a dividing node 261, and a comparator amplifier 263 having a first input at reference voltage $V_{REF}$, a second input coupled to dividing node 261 and providing at the output the stop signal STOP.

The voltage divider 260 is formed by a first branch 260A, including here an RC parallel circuit and coupled between the output node 54 and the dividing node 261, and a second branch 260B, including here an RC parallel circuit and coupled between the dividing node 261 and the ground 57.

In practice, reference voltage $V_{REF}$ may be equal to output voltage $V_{OUT}$ or a function of output function $V_{OUT}$, depending on the specific application.

The practical implementation of the described embodiments and variations is within the abilities of those skilled in the art based on the functional indications given hereabove.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A voltage regulator, comprising:
   a charge pump circuit coupled between an input node of the voltage regulator and an output node of the voltage regulator, the charge pump circuit configured to generate an output voltage at the output node based on a respective boosting control signal, the output voltage having a boosted value with respect to an input voltage received at the input node;
   a feedback regulation circuit configured to generate a first operation control signal and a second operation control signal as a function of the output voltage;
   a phase control circuit configured to generate a boosting control signal as a function of the first operation control signal; and a filter configured to inject into or sink from the output node, a charge that is a function of the second operation control signal.

2. The voltage regulator of claim 1, wherein the filter comprises a capacitive element having a first terminal and a second terminal, the first terminal coupled to the output node, and the second terminal configured to receive the second operation control signal.

3. The voltage regulator of claim 1, wherein the feedback regulation circuit comprises an inverter configured to receive the first operation control signal and generate the second operation control signal.

4. The voltage regulator of claim 3, wherein the inverter is a first inverter, the feedback regulation circuit further comprising a second inverter configured to receive the second operation control signal and generate a third operation control signal, the filter comprising a capacitive element having a first terminal and a second terminal, the first terminal coupled to the output node, and the second terminal configured to receive the third operation control signal.

5. The voltage regulator of claim 4, wherein the first inverter has a first response time in generating the second operation control signal in response to switching of the first operation control signal, and wherein the second inverter has a second response time in generating the third operation control signal in response to switching of the second operation control signal, the second response time being greater than the first response time.

6. The voltage regulator of claim 1, wherein the feedback regulation circuit comprises a comparator configured to:
compare the output voltage to a reference voltage;
switch the first operation control signal to a first value in response to the output voltage being greater than the reference voltage; and
switch the first operation control signal to a second value in response to the output voltage being less than the reference voltage.

7. The voltage regulator of claim 6, wherein the phase control circuit is configured to:
disable boosting of the input voltage by the charge pump circuit in response to the first operation control signal switching to the first value; and
enable the boosting of the input voltage by the charge pump circuit in response to the first operation control signal switching to the second value.

8. The voltage regulator of claim 1, wherein the voltage regulator is a voltage regulator of a non-volatile memory.

9. The voltage regulator of claim 8, wherein the non-volatile memory is a phase-change memory.

10. A method, comprising:
generating, by a charge pump circuit of a voltage regulator, an output voltage at an output node of the voltage regulator, the output voltage being a boosted value with respect to an input voltage received at an input node of the voltage regulator, the output voltage being based on a respective boosting control signal, the charge pump circuit coupled between the input node and the output node;
generating, by a feedback regulation circuit of the voltage regulator, a first operation control signal and a second operation control signal as a function of the output voltage;
generating, by a phase control circuit of the voltage regulator, a boosting control signal as a function of the first operation control signal; and injecting into or sinking from, by a filter of the voltage regulator, the output node a charge that is a function of the second operation control signal.

11. The method of claim 10, wherein generating the second operation control signal comprises inverting the first operation control signal to generate the second operation control signal.

12. The method of claim 10, wherein the filter comprises a first capacitive element, a first terminal of the first capacitive element coupled to the output node, the method further comprising receiving the second operation control signal at a second terminal of the first capacitive element.

13. The method of claim 12, wherein the filter comprises a second capacitive element, a first terminal of the second capacitive element coupled to the output node, the method further comprising:
generating, by the feedback regulation circuit, a third operation control signal; and
receiving, by a second terminal of the second capacitive element, the third operation control signal, the third operation control signal being an inverted signal with respect to the second operation control signal.

14. The method of claim 10, further comprising:
comparing the output voltage to a reference voltage;
switching the first operation control signal to a first value in response to the output voltage being greater than the reference voltage; and
switching the first operation control signal to a second value in response to the output voltage being less than the reference voltage.

15. The method of claim 10, wherein the step of injecting into or sinking from the output node is performed faster than a step of providing, by the phase control circuit, the respective boosting control signal to the charge pump circuit.

16. A device comprising a non-volatile memory having a voltage regulator, the voltage regulator comprising:
a charge pump circuit coupled between an input node of the voltage regulator and an output node of the voltage regulator, the charge pump circuit configured to generate an output voltage at the output node based on a respective boosting control signal, the output voltage having a boosted value with respect to an input voltage received at the input node;
a feedback regulation circuit configured to generate a first operation control signal and a second operation control signal as a function of the output voltage;
a phase control circuit configured to generate a boosting control signal as a function of the first operation control signal; and
a filter configured to inject into or sink from the output node, a charge that is a function of the second operation control signal.

17. The device of claim 16, wherein the filter comprises a capacitive element having a first terminal and a second terminal, the first terminal coupled to the output node, and the second terminal configured to receive the second operation control signal, and wherein the feedback regulation circuit comprises an inverter configured to receive the first operation control signal and generate the second operation control signal.

18. The device of claim 17, wherein the inverter is a first inverter, the feedback regulation circuit further comprising a second inverter configured to receive the second operation control signal and generate a third operation control signal, the filter comprising a capacitive element having a first terminal and a second terminal, the first terminal coupled to the output node, and the second terminal configured to receive the third operation control signal.

19. The device of claim 18, wherein the first inverter has a first response time in generating the second operation control signal in response to switching of the first operation control signal, and wherein the second inverter has a second response time in generating the third operation control signal in response to switching of the second operation control signal, the second response time being greater than the first response time.

20. The device of claim 16, wherein the feedback regulation circuit comprises a comparator configured to:
   compare the output voltage to a reference voltage;
   switch the first operation control signal to a first value in response to the output voltage being greater than the reference voltage; and
   switch the first operation control signal to a second value in response to the output voltage being less than the reference voltage, and
   wherein the phase control circuit is configured to:
   disable boosting of the input voltage by the charge pump circuit in response to the first operation control signal switching to the first value, and
   enable the boosting of the input voltage by the charge pump circuit in response to the first operation control signal switching to the second value.

* * * * *